US008966925B1

(12) United States Patent
DeClementi

(10) Patent No.: US 8,966,925 B1
(45) Date of Patent: *Mar. 3, 2015

(54) PORTABLE COOLING DEVICE

(71) Applicant: Anthony DeClementi, Orange Park, FL (US)

(72) Inventor: Anthony DeClementi, Orange Park, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/103,636

(22) Filed: Dec. 11, 2013

Related U.S. Application Data

(63) Continuation-in-part of application No. 13/170,128, filed on Jun. 27, 2011, now Pat. No. 8,631,665.

(51) Int. Cl.
| | |
|---|---|
| *F28D 5/00* | (2006.01) |
| *F25B 27/00* | (2006.01) |
| *F25D 3/02* | (2006.01) |
| *F25D 11/00* | (2006.01) |
| *F28C 3/08* | (2006.01) |

(52) U.S. Cl.
CPC ............... *F25D 11/003* (2013.01); *F28C 3/08* (2013.01)
USPC ................ 62/314; 62/236; 62/259.3; 62/331; 62/425; 62/420; 415/213.1; 415/214.1; 416/142

(58) Field of Classification Search
CPC .............. F25D 3/08; F25D 3/06; F25D 3/02; F25D 7/02; F25D 23/026; F25D 23/028; F25D 23/061; F25D 23/062; F25D 23/064; F25D 23/083; F25D 23/0831; F25D 23/0843
USPC ........ 62/457.1, 459, 464, 331, 390, 396, 398; 261/88, 89

See application file for complete search history.

(56) References Cited

U.S. PATENT DOCUMENTS

| | | | |
|---|---|---|---|
| 6,463,756 B1 | 10/2002 | Lewis | |
| 7,395,676 B2 | 7/2008 | White | |
| 7,418,832 B2 * | 9/2008 | Ferrono et al. | ................... 62/372 |
| D604,108 S | 11/2009 | Paslawski | |
| 8,631,665 B1 * | 1/2014 | DeClementi | .................... 62/314 |
| 2006/0032259 A1 * | 2/2006 | White | .............................. 62/314 |

* cited by examiner

*Primary Examiner* — Frantz Jules
*Assistant Examiner* — Erik Mendoza-Wilkenfe
(74) *Attorney, Agent, or Firm* — Crossley Patent Law

(57) ABSTRACT

A portable cooling device including an insulated housing and a water cooler system, whereby water stored in a reservoir, or alternatively water introduced into the system through a specific inlet, is directed through a boustrophedonic series of piping to an ancillary misting head and to at least one misting orifice disposed proximal to at least one fan, which fan is directable within a fan housing, when a chilled mist is directionably propelled from the device. The device has a power system including a photocell, a power inlet, and a battery, configureable to different situations to selectively engage the water cooler system and each fan.

17 Claims, 6 Drawing Sheets

PORTABLE COOLING DEVICE

BACKGROUND OF THE INVENTION

Various types of portable cooling device are known in the prior art. However, what is needed is a portable cooling device that includes a water cooler system with at least one fan, at least one misting orifice, an ancillary misting head, a photocell, and a water reservoir.

FIELD OF THE INVENTION

The present invention relates to a portable cooling system, and more particularly, to a portable cooling device with a water cooler system and at least one fan, at least one misting orifice, an ancillary misting head, a photocell, and a water reservoir.

SUMMARY OF THE INVENTION

Having worked for more than a decade installing swimming pools in the Floridian sun—work requiring an amount of manual labor without shade—I well know the hazards and discomfort of working in the heat of the outdoors without recourse to a cooled ambient surrounding. Heatstroke, dehydration, and fatigue are just some examples of the problems humans may encounter when physically laboring in the heat of a summer day, problems which may pose serious consequences to a person's health. In the midst of one such summer day and toilsome physical labor, the inspiration for the present device did present itself to me.

What is needed is a portable cooling device, easily transportable between unconditioned spaces (such as the rear of a pick-up truck or any number of outdoor work stations), and able to emit a cooling vapor of chilled water by which a person can cool down and become refreshed. I devised such an invention in the form of a portable ice chest enclosing an insulated space, having a reservoir disposed within, the reservoir connected to a boustrophedonic series of piping, said piping continuously disposed about the ice chest interior and further connected by a network of flex tubing to an ancillary misting head having a misting outlet with a quick connect coupling disposed in any side wall, front or rear wall, or lid of the ice chest and to a plurality of misting orifices, whereby water is routed by means of a self-priming pump from the reservoir through the boustrophedonic piping to the ancillary misting head and to the misting orifices, and there dispelled forcibly outward by a plurality of fans located upon the portable cooling device lid. The water so routed is cooled considerably by the addition of ice within the portable cooling device. The water is pumped through the boustrophedonic piping where heat is exchanged, the piping in continuous contact with ice placed within the device. Heat is thus conducted out of the water pumped through the piping and a cold mist is produced at the misting outlet and at the misting orifices, there dispelled by the fans and directed as desired.

Further, beverages placed within the interior may be cooled by means of the ice therein and assist in rehydrating and cooling persons operating the device.

A power system engaging a number of alternate power sources is included in the device, allowing the device to be operated and adapted to a number of different scenarios and situations. First, being a device most applicable for outdoor use in hot and sunny climes, a photocell is disposed upon the lid to tap the abundant energy in sunlight and power the device renewably. Second, a rechargeable battery is included within the device allowing operation free of attachment to any power outlet while in the shade, or even at night. Third, a power inlet is configured to connect the device to a standard 12 Volt external battery via an automobile power supply port or, via an adapter, to a standard 120 Volt power outlet typical of the home. The battery is rechargeable and the device can operate from each power source independently.

The portable cooling device is also configured to receive water directed therein by means of a garden hose, so as to provide a continuous source of water to the misting orifices as desired.

The device is conceived with multiple applications where cooling is desired in outdoor spaces or spaces lacking temperature control, including use on the jobsite as well as use within boats and other vehicles.

Thus has been broadly outlined the more important features of the present portable cooling device so that the detailed description thereof that follows may be better understood and in order that the present contribution to the art may be better appreciated.

BRIEF DESCRIPTION OF THE DRAWINGS

Figures

DETAILED DESCRIPTION OF THE DRAWINGS

Figure 1:
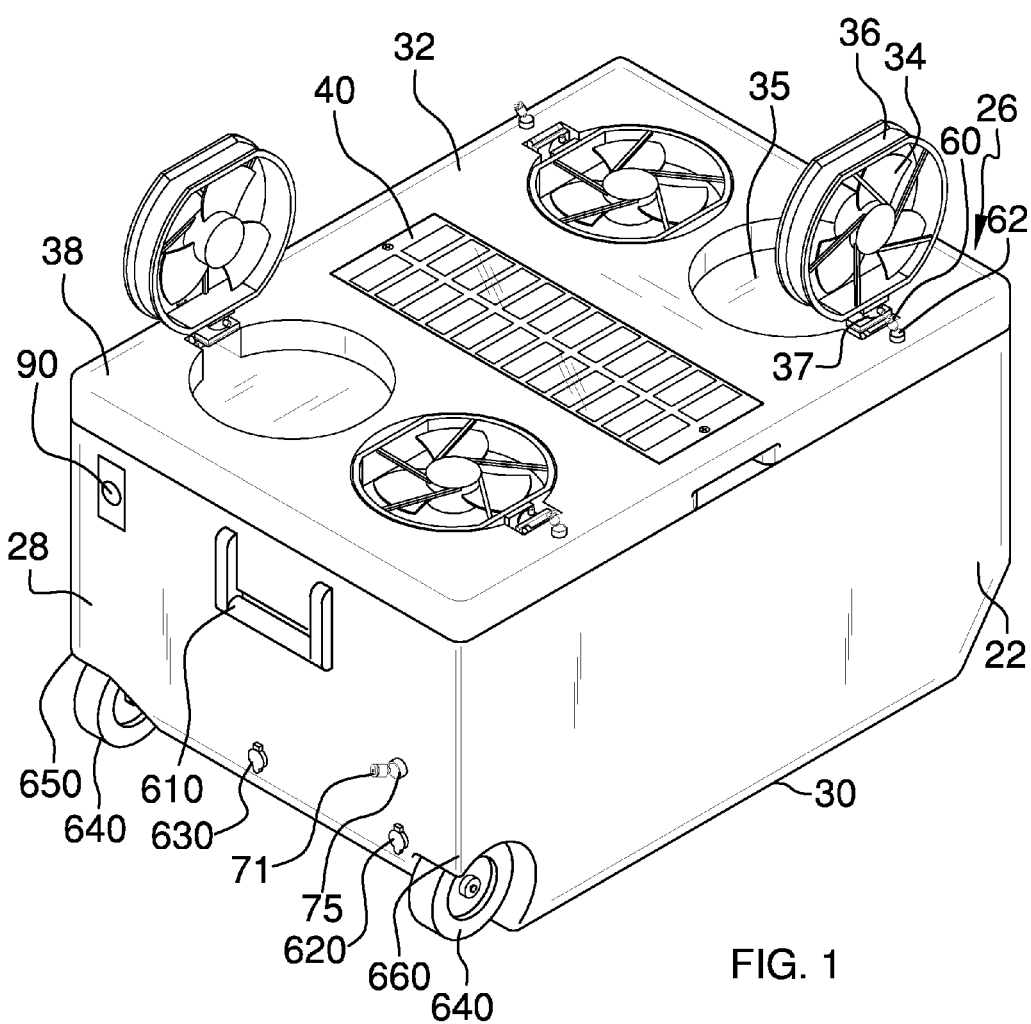
FIG. 1 is an isometric view.
Figure 2:
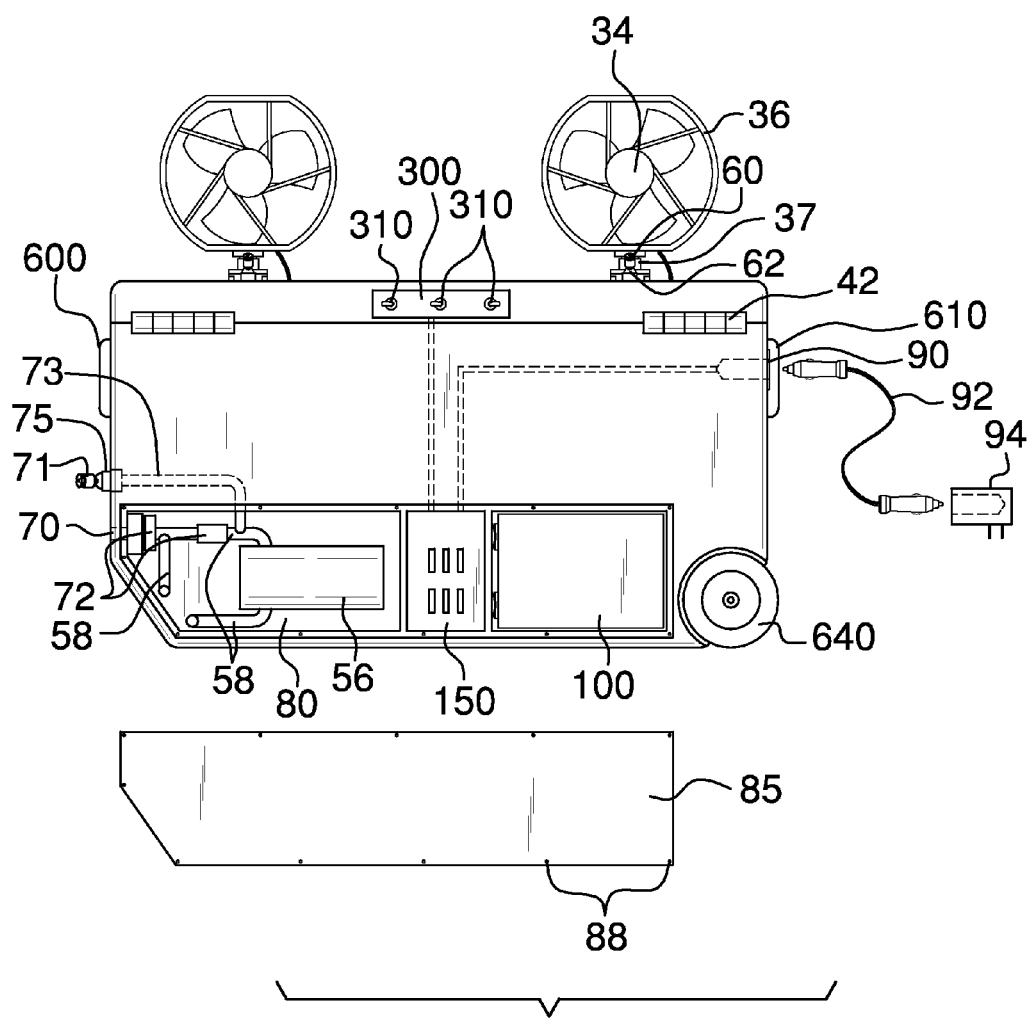
FIG. 2 is a back view with the access panel removed.
Figure 3:
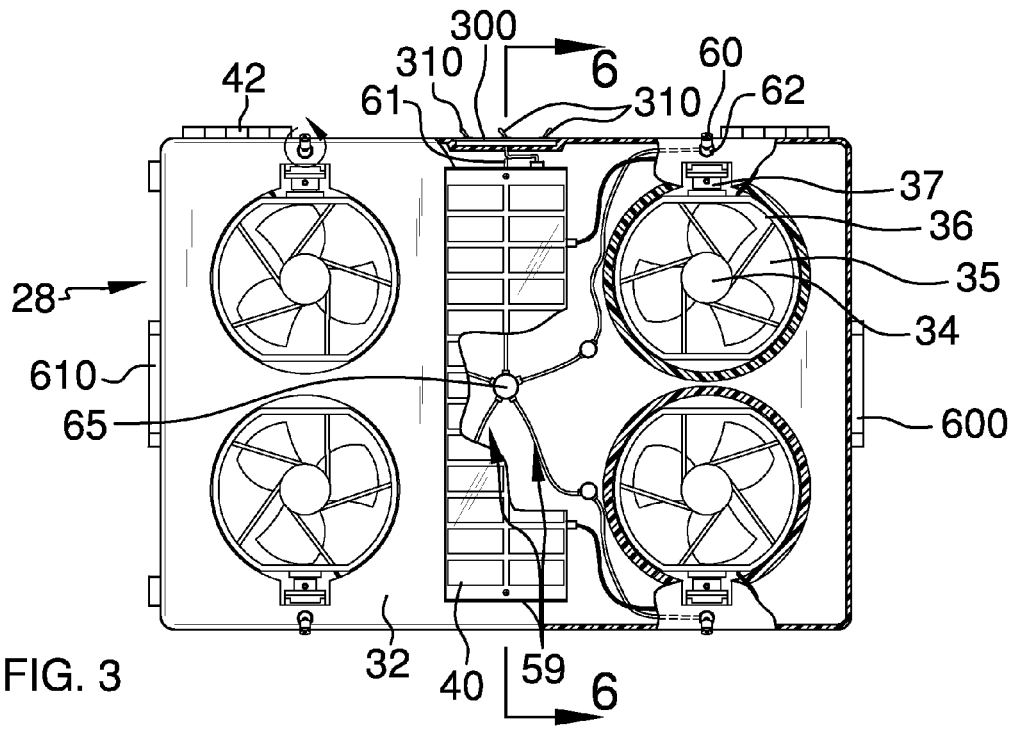
FIG. 3 is a top view.
Figure 4:
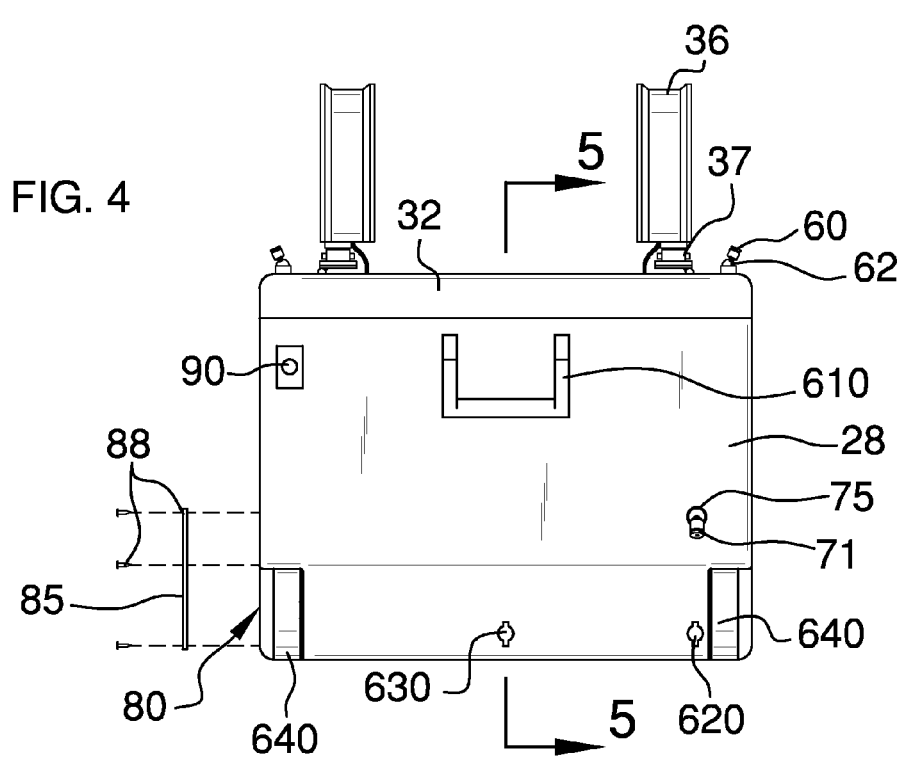
FIG. 4 is a side view.
Figure 3A:
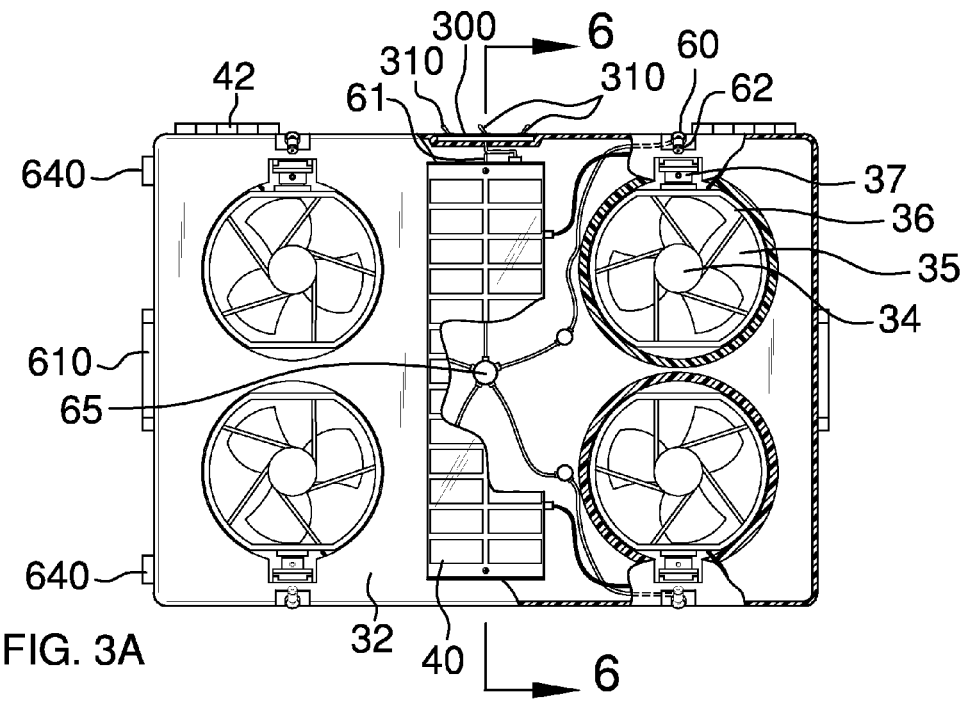
FIG. 3A is a top view illustrating the misters in a recessed position
Figure 4A:
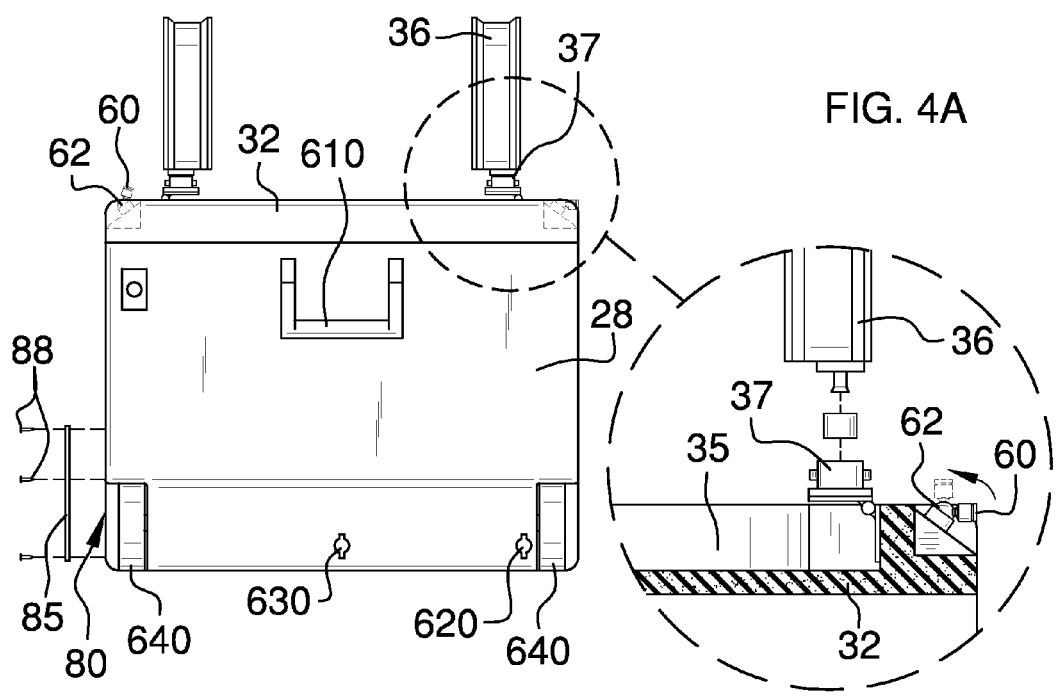
FIG. 4A is a side view illustrating the misters in a recessed position
Figure 5:
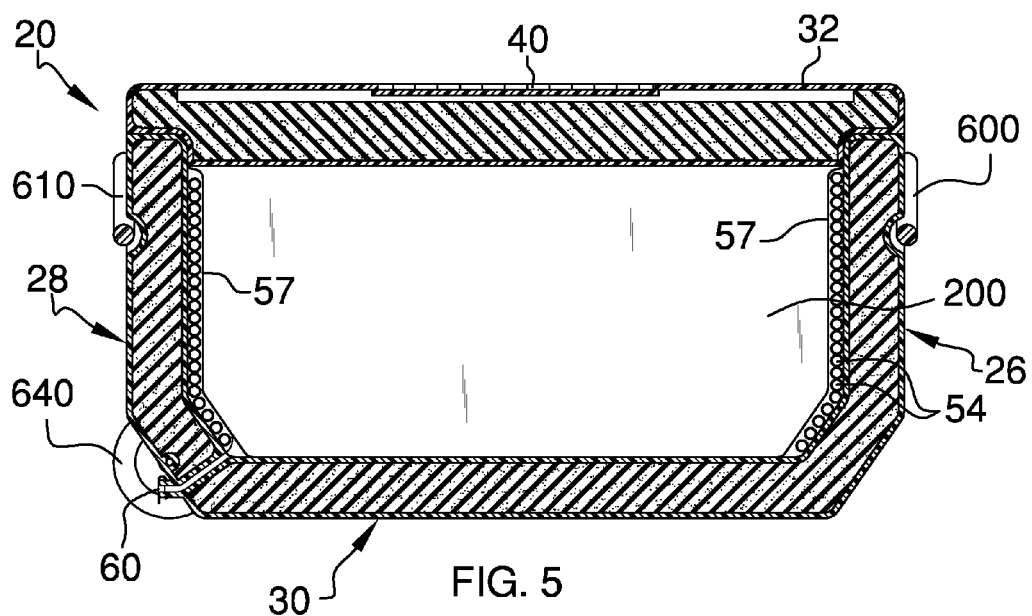
FIG. 5 is a cross section view taken across the line 5-5 of FIG. 4.
Figure 6:
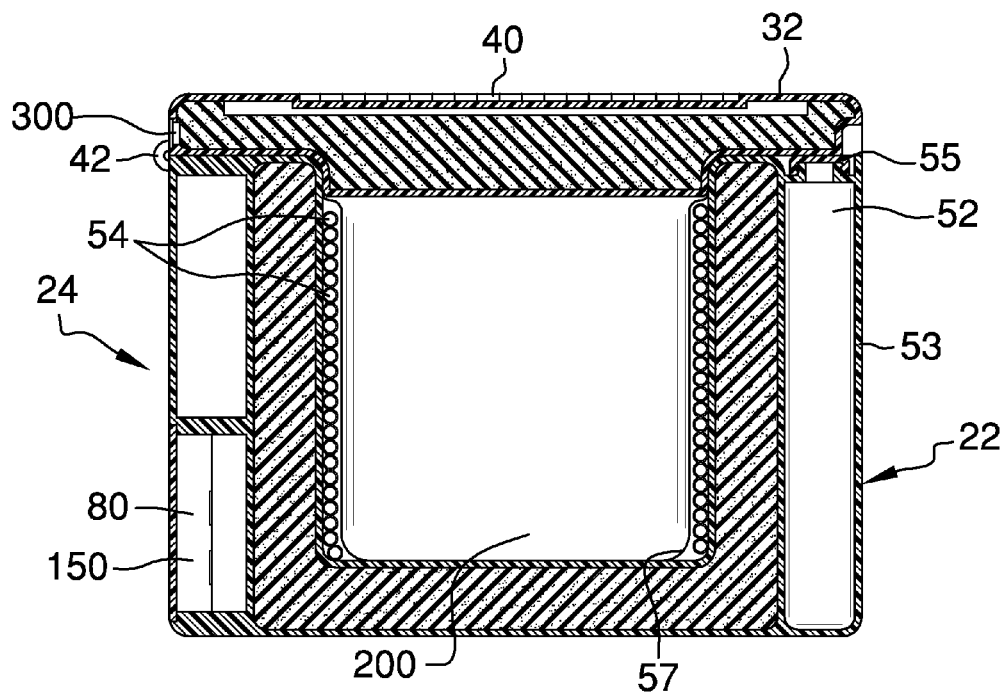
FIG. 6 is a cross section view taken across the line 6-6 of FIG. 3.
Figure 7:
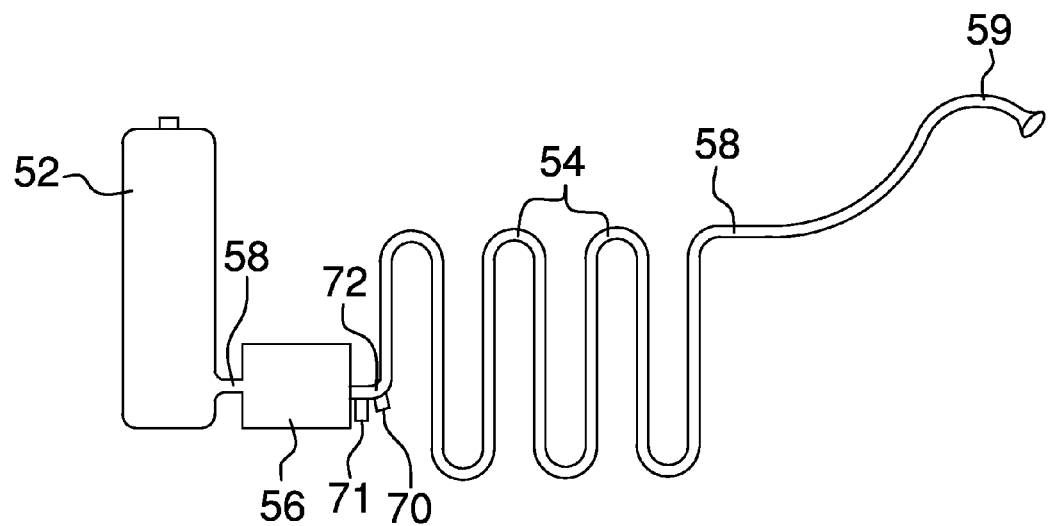
FIG. 7 is a schematic view of the water cooler system.
Figure 8:
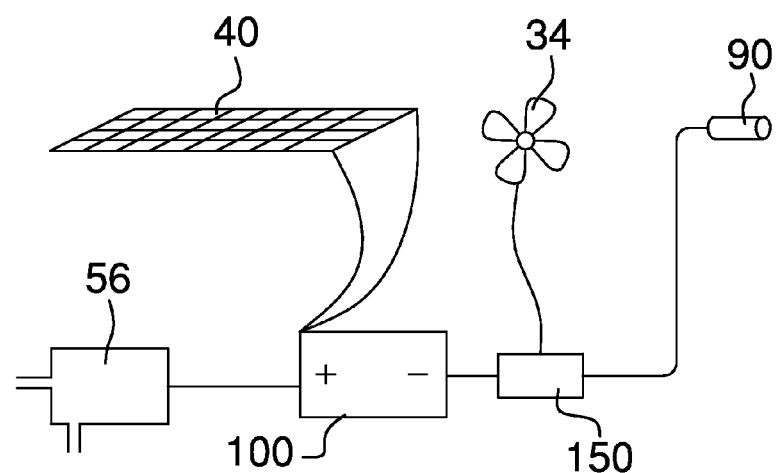
FIG. 8 is a schematic view of the power system.

With reference now to the drawings, and in particular FIGS. 1 through 8 thereof, example of the instant portable cooling device employing the principles and concepts of the present portable cooling device and generally designated by the reference number 10 will be described.

Referring to FIGS. 1 through 8 a preferred embodiment of the portable cooling device 10 is illustrated.

It is understood that minor variations in the placement and situation of the parts and elements comprising the device 10 are anticipated from the preferred embodiment here presented, and that discussion of any particular element, and said element's particular situation specifically, does not exclude a repositioning of said element, as dictated by manufacture and functionality concerns, to another situation where said element's function is further assisted to meet the present design.

That being said, the present portable cooling device 10 comprises an insulated housing 20 including a front wall 22, a rear wall 24, a right side wall 26, a left side wall 28, a base 30, and a lid 32.

At least one fan 34 is pivotally attached to an exterior surface 38 of the lid 32. Each fan 34 is disposed within a fan housing 36. Each fan housing 36 is pivotally attached to the exterior surface 38 of the lid 32 by means of a hinge mount 37. Each fan housing 36 is stored in a first position, the fan housing 36 folded down in a recess cavity 35 in the lid 32 exterior surface 38. Each fan housing 36 is pivotally raised into a second position for operation. The fan housing 36 pivots upon the hinge mount 37 along an axis perpendicular to the ground when moved from the first to the second position. The fan housing 36 is further selectively directional when in the second position, the hinge mount 37 rotational along a transverse axis generally parallel with the ground. Each fan 34 is thusly capable of directional manipulation, and can be positioned to direct an airflow as desired by the operator or operators.

A photocell 40 is disposed upon the lid 32 exterior surface 38 to transform sunlight into electrical energy. Sunlight incident the photocell 40 thereby provides an abundant source of power to operatively engage each fan 34, a water cooler system 50, and also to recharge a battery 100, as described further in subsequent sections of this detailed description.

In the preferred embodiment shown, the lid 32 is attached to the cooling device rear wall 24 by at least two hinges 42 enabling the lid 32 to move from a closed position to an open position so to access an interior 200 of the cooling device 10 and place ice, or other cold objects, within the insulated housing 20. However, alternate attachment mechanisms are understood that enable the lid 32 to open and close as desired.

The present device 10 includes a water cooler system 50. The water cooler system 50 comprises a reservoir 52, a boustrophedonic series of piping 54, a self-priming pump 56, a network of flex tubing 58, and at least one misting orifice 60 disposed proximal to each fan 34 within each fan housing 36.

The reservoir 52 is a parallelepiped container disposed within an interior cavity 53 within the device 10 front wall 22. The reservoir 52 is accessible through a cap 55 disposed atop the reservoir 52. This cap 55 is located under the cooling device 10 lid 32. Through this cap 55, the reservoir 52 is filled with water as desired.

The boustrophedonic series of piping 54 is continuously disposed across the interior 200 faces of the cooling device 10 front 22, rear 24, right side 26, and left side 28 walls. A protective coating 57 encloses the piping 54. The coating 57 is conductive to heat to allow for heat exchange through the piping 54 into the cooling device 10 interior 200. Water directed through the piping 54 is therefore subjected to the transfer of heat during its passage; more particularly when ice is located within the cooling device 10 interior 200, said ice is in continuous contact with the protective coating 57 through which heat is transferred from the water in the piping 54 into the cooling device 10 interior 200.

The self-priming pump 56 forces water from the reservoir 52 through the piping 54, to the network of flex tubing 58, and thence to each misting orifice 60. A flex tubing 58 end portion 59 is disposed within the housing 20 lid 32 and terminates at each misting orifice 60. Each misting orifice 60 is disposed proximal to each fan 34 in each fan housing 36. Each misting orifice 60 is disposed upon a swivel mount 62, which swivel mount 62 can be directionally swiveled, as desired. The mist produced at each misting orifice 60 is thereby directionally borne aloft and propelled forward, the mist forced directionally by the fan 34 as desired.

An in-line filter 61 is disposed within the flex tubing 58 end portion 59 to prevent precipitate build up at each misting orifice 60.

In this manner, the water cooler system 50 transfers heat from water stored in the cooling device 10 reservoir 52 and thereafter propels a cold mist from each fan 34 disposed on the cooling device 10 lid 32 exterior surface 38, which mist is refreshing and cooling to any person on whom it is directed.

Alternately, water is introduced into the water cooler system 50 at a hose inlet 70, whence water from a garden hose is forced into the piping 54 and thence directed to each misting orifice 60, enabling operation of the cooling device 10 water cooler system 50 without the action of the self-priming pump 56 operatively engaging the reservoir 52, as desired. A backflow preventer 72 controls water flow unidirectionally through the flex tubing 58.

An ancillary misting head 71 is also fluidly connected to the flex tubing 58 between the backflow preventer 72 and the self-priming pump 56. A length of second tubing 73 fluidly connects a misting outlet 75 disposed on one of the front wall, the rear wall, the left side wall, the right side wall 28, and the lid of the housing to the flex tubing 58. The misting outlet 75 is shown on the right side wall 28 for exemplary purposes only. The ancillary misting head 71 is configured to be attachable to a length of auxiliary tubing attachable to a structure, such as an awning, a shelter, or a tent camping trailer, to provide a water mist for cooling.

A mechanical compartment 80 is disposed within the rear wall 24 of the cooling device 10. The mechanical compartment 80 is accessible behind an access panel 85 removably attached to the device 10 by a plurality of fasteners 88.

The self-priming pump 56 and the battery 100 are located within the mechanical compartment 80. The self-priming pump 56 and battery 100 are accessible within the mechanical compartment 80 should repairs or replacement become necessary.

The present device 10 includes a power system 500 configurable to engage a plurality of power sources depending upon the situation in which the portable cooling device 10 is utilized. The power system includes a battery 100, a photocell 40, and a power inlet 90. The power inlet is configured to connect the portable cooling device 10 to a external power source by means of a power cord 92.

The power inlet 90 is configured within the device 10, shown here disposed within the left side wall 26, wherein the power cord 92 connects the device 10 to an automobile power supply port. The power cord 92 is alternately connectable to a standard 120 Volt power outlet by means of an adapter 94. The power inlet 90 connects a preferred external power supply to the battery 100. The battery 100 is rechargeable, and the external power source is used to recharge the battery 100. The external power source, by means of the device 10 power inlet 90, also operatively engages the water cooler system 50 and each fan 34 when connected to the device 10.

Additionally, the photocell 40 operatively engages the water cooling system 50, each fan 34, and recharges the battery 100 as desired.

A panel 300 with power switches 310 enables switching between the battery 100, power inlet 90 external power source, and photocell 40 as desired by the user. The switches 310 also allow for selective operation of each fan 34 with or alternately without the pump 56 engaging each misting orifice 60. Thus, when water is introduced into the device 10 by the hose inlet 70, the pump 56 may be powered off and the fan(s) operated independent of the pump 56, as desired.

A fuse box 150 is disposed within the mechanical compartment 80. The fuse box 150 regulates the electrical current powering the device 10 depending on which power source is engaging the cooler system 50 at any particular time. The fuse box 150 is accessible within the mechanical compartment when the access panel 85 is removed.

For portability the device 10 has handles, 600 and 610, centrally disposed within the right 26 and left 28 side walls. For movability, the device has at least two wheels 640 rotatably attached at an edge of the base 30, shown here in the preferred embodiment at corners 650 and 660 of the front 22 and left side 28 walls and the rear 24 and left side 28 walls respectively.

A reservoir drain 620 is located in the bottom of the left side wall 28 by which the reservoir 52 may be drained of any remaining fluids after use. The device 10 is lifted opposite the reservoir drain 620, raising the right side wall 26. The device is pivoted upon the device 10 wheels 640 and the water flows freely from the reservoir 52 through the drain 620.

A cooler drain 630 is centrally disposed at the bottom of the left side wall 28 by which the insulated housing 20 interior 200 may be drained of any melt water remaining after use, or before re-supplying the insulated housing 20 interior 200 with additional ice.

The portable cooling device 10 therefore provides a convenient means of producing a chilled mist by which to cool and refresh oneself when laboring in hot environments. The aforementioned chilled mist is directionally manipulated by means of each rotatable fan housing 36 and each swivel mounted misting orifice 60. The portable cooling device 10 has been configured to be useable under various scenarios and at differing locations and offers new and useful improvements to the art. Furthermore use of the present device 10 has been shown to reduce the ambient temperature by 30 degrees.

What is claimed is:

1. A portable cooling device comprising:
    an insulated housing including a front wall, a rear wall, a left side wall, a right side wall, a base, and a lid;
    at least one fan disposed within a fan housing, the fan housing pivotally and rotatably attached to an exterior surface of the lid;
    a water cooler system disposed within the housing;
    a power system operationally engaging the water cooler system and each fan;
    wherein the water cooler system comprises:
        a reservoir disposed within a cavity inside the front wall of the cooler;
        a boustrophedonic series of piping continuously disposed upon an interior of the insulated housing walls;
        a self-priming pump in operational communication with the reservoir;
        at least one misting orifice disposed within the housing lid proximal to each fan;
        a network of flex tubing interconnecting the reservoir, the self-priming pump, the boustrophedonic piping and each misting orifice; and
        an ancillary misting head comprising a misting outlet disposed on one of the front wall, the rear wall, the left side wall, the right side wall and the lid of the housing and a length of second tubing directly fluidly interconnecting the misting outlet and the flex tubing in a position directly adjacent the self-priming pump.

2. The portable cooling device of claim 1 wherein the power system comprises:
    a photocell disposed on an exterior surface of the lid;
    a power inlet connectable to an external power source via a power cord; and
    a rechargeable battery in circuit with the photocell and power inlet.

3. The water cooler system of claim 2 wherein the boustrophedonic piping is enclosed within a protective coating, the coating continuously disposed toward the interior of the housing.

4. The water cooler system of claim 3 wherein the network of flex tubing includes a terminal connectable to an external hosepipe wherein water may be introduced into the water cooler system from an external source.

5. The water cooler system of claim 4 wherein the terminal has a backflow preventer, the backflow preventer controlling water flow unidirectionally through the water cooler system;
    wherein the second tubing of the ancillary misting head is fluidly connected to the flex tubing between the backflow preventer and the self-priming pump.

6. The water cooler system of claim 5 wherein the photocell and alternately the power inlet recharge the battery.

7. The water cooler system of 6 further comprising an adapter;
    wherein the power cord operationally engages an automobile power supply port and a standard 120 Volt power outlet through the adapter.

8. The power inlet of claim 7 wherein the inlet is configured to operationally engage a standard 120V power supply through the adapter.

9. The power system of claim 8 further comprising a fuse box;
    wherein the fuse box is configured to regulate a current flowing between the battery, the power inlet and the photocell;
    wherein the fuse box is further configured to distribute the current to the cooler system and each fan.

10. The portable cooling device of claim 9 further comprising a mechanical compartment disposed within the housing rear wall;
    wherein the mechanical compartment contains the self-priming pump, the battery and the fuse box.

11. The mechanical compartment of claim 10 further comprising:
    an access panel removably attached to the housing proximal to the mechanical compartment;
    a plurality of fasteners disposed on the panel;
    wherein the fasteners removably attach the access panel to the housing; and
    whereby the access panel encloses the mechanical compartment.

12. A portable cooling device comprising:
    an insulated housing including a front wall, a rear wall, a left side wall, a right side wall, a base, a lid, and a mechanical compartment;
    at least one fan disposed within a fan housing, the fan housing directionally attached to an exterior surface of the lid;
    a water cooler system and a power system;
    the water cooler system comprising:
        a reservoir disposed within a cavity within the housing front wall;
        a series of boustrophedonic piping continuously disposed upon the interior faces of the insulated housing walls;
        a self-priming pump in operational communication with the reservoir;
        at least one misting orifice disposed proximal to each fan;
        a network of flex tubing interconnecting the reservoir, the pump, the boustrophedonic piping, and each misting orifice;
        an ancillary misting head comprising a misting outlet disposed on one of the front wall, the rear wall, the left side wall, the right side wall and the lid of the housing and a length of second tubing directly fluidly interconnecting the misting outlet and the flex tubing in a position directly adjacent the self-priming pump;
        wherein water is pumped from the reservoir through the boustrophedonic piping to the misting orifices and to the ancillary misting head;

the power system comprising:
- a battery operatively engaging the pump and each fan;
- a photocell, disposed atop an exterior surface of the lid, in circuit to recharge the battery and engage the pump and each fan;
- a power inlet, configured to connect the portable cooling device to an outside power source, and in circuit to power the device and recharge the battery.

13. The portable cooling device of claim 12 further comprising handles attached to the right and left side walls of the housing.

14. The portable cooling device of claim 13 further comprising a wheel disposed at each corner disposed between the base and the left, front, and rear walls.

15. The portable cooling device of claim 14 further comprising a drain disposed within a side wall of the reservoir.

16. The portable cooling device of claim 15 further comprising a drain disposed within a side wall of the interior.

17. The portable cooling device of claim 16 wherein the lid is hingedly attached to the rear wall.

* * * * *